(12) United States Patent
Narang et al.

(10) Patent No.: US 8,661,037 B2
(45) Date of Patent: Feb. 25, 2014

(54) SYSTEM AND METHOD FOR MULTITHREADED TEXT INDEXING FOR NEXT GENERATION MULTI-CORE ARCHITECTURES

(75) Inventors: Ankur Narang, New Delhi (IN); Karthik V. Swaminathan, Mumbai (IN); Prashant Agrawal, Barbil (IN); Doug Joseph, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 12/757,545

(22) Filed: Apr. 9, 2010

(65) Prior Publication Data

US 2011/0252033 A1    Oct. 13, 2011

(51) Int. Cl.
*G06F 17/00* (2006.01)
(52) U.S. Cl.
USPC .......................................................... 707/737
(58) Field of Classification Search
USPC ................................................. 707/737, 741
See application file for complete search history.

(56) References Cited

U.S. PATENT DOCUMENTS

| | | | |
|---|---|---|---|
| 6,292,802 B1 | 9/2001 | Kessenich et al. | |
| 6,553,372 B1 | 4/2003 | Brassell et al. | |
| 7,240,069 B2 | 7/2007 | Samsonov | |
| 7,543,132 B1 * | 6/2009 | Grohoski et al. | 711/204 |
| 7,779,002 B1 * | 8/2010 | Gomes et al. | 707/728 |
| 8,135,723 B2 * | 3/2012 | Vaid et al. | 707/755 |
| 2002/0059281 A1 * | 5/2002 | Watanabe et al. | 707/100 |
| 2004/0128277 A1 | 7/2004 | Mander et al. | |
| 2004/0205497 A1 * | 10/2004 | Alexander et al. | 715/501.1 |
| 2005/0137998 A1 | 6/2005 | Betts et al. | |
| 2006/0212795 A1 | 9/2006 | Cottrille et al. | |
| 2007/0078848 A1 | 4/2007 | Sareen et al. | |
| 2008/0270345 A1 * | 10/2008 | Barlow et al. | 707/E17.002 |
| 2009/0313706 A1 * | 12/2009 | Zhang et al. | 707/3 |
| 2010/0332765 A1 * | 12/2010 | Cypher | 707/802 |
| 2011/0191508 A1 * | 8/2011 | Printezis et al. | 711/E12.009 |

OTHER PUBLICATIONS

Garcia et al. "Pipelined hash-join on mutithreaded architectures" Proceedings of the Third International Workshop on Data Management on New Hardware (DaMoN 2007), Jun. 15, 2007, Beijing, China. Copyright 2007 Acm 978-1-59593-772-8 (8 pp.).*
Barroso, L., et al. "Web Search for a Planet: The Google Cluster Architecture" IEEE Computer Society. 2003 IEEE. IEEE Micro, vol. 23, No. 02. Mar. 2003. pp. 22-28.

(Continued)

*Primary Examiner* — Rehana Perveen
*Assistant Examiner* — Thuy Bui
(74) *Attorney, Agent, or Firm* — Tutunjian & Bitetto, P.C.; Jennifer R. Davis

(57) ABSTRACT

A system and method for indexing documents in a data storage system includes generating a single document hash table in storage memory for a single document using an index construction in a multithreaded and scalable configuration wherein multiple threads are each assigned work to reduce synchronization between threads. The single document hash table includes partitioning the single document and indexing strings of partitioned portions of the single document to create a minor hash table for each document sub-part; generating a document level hash table from the minor hash tables; updating a stream level hash table for the strings which maps every string to a global identifier; and generating a term reordered array from the document level hash table.

22 Claims, 11 Drawing Sheets

(56) References Cited

OTHER PUBLICATIONS

Buttcher, S. "Multi-User File System Search" Ph.D. Dissertation. University of Waterloo. 2007. (232 Pages).

Dean, J., et al. "Mapreduce: Simplified Data Processing on Large Clusters" OSDI 2004. In Proceedings of the 6th Symposium on Operating Systems Design & Implementation. Dec. 2004. pp. 1-13.

Heinz, S., et al. "Efficient Single-Pass Index Construction for Text Databases" Journal of the American Society for Information Science and Technology. Jun. 2003. pp. 1-30.

Melnik, S., et al. "Building a Distributed Full-Text Index for the Web" ACM Transactions on Information Systems. vol. 19, No. 3. Jul. 2001. pp. 217-241.

Moreira, J., et al. "Scalability of the Nutch Search Engine" ICS '07. In Proceedings of the 21st Annual International Conference on Supercomputing. Jun. 2007. pp. 3-12.

Narang, A., et al. "Scalable Algorthm for Distributed In-Memory Text Indexing" IBM Research. Technical Report RI08009. Jun. 2008. pp. 1-20.

Rao, J., et al. "Cache Conscious Indexing for Decision-Support in Main Memory" Proceedings of 25th International Conference on Very Large Data Bases. Sep. 1999. pp. 0-17.

Tomasic, A., et al. "Performance Issues in Distributed Shared-Nothing Information Retrieval Systems" Information Processing and Management. vol. 32, No. 6, Aug. 1996. pp. 1-20.

Zhang, Y., et al. "GPU-Accelerated Text Mining" EPHAM '09. Mar. 2009. (5 Pages).

Zobel, J., et al. "Inverted Files for Text Search Engines" ACM Computing Surveys. vol. 38, No. 2, Article 6. Jul. 2006. pp. 1-56.

\* cited by examiner

SYSTEM AND METHOD FOR MULTITHREADED TEXT INDEXING FOR NEXT GENERATION MULTI-CORE ARCHITECTURES

GOVERNMENT RIGHTS

This invention was made with Government support under Contract No.: H98230-07-C-0409 awarded by the Department of Defense (DOD). The Government has certain rights in this invention.

BACKGROUND

1. Technical Field

The present invention relates to document indexing and more particularly to systems and methods for multi-thread, multi-core processing of documents.

2. Description of the Related Art

Stream computing research is becoming an area of great interest in academia and industry especially at terascale and petascale levels. Indexing large numbers of real-time streams with a high data rate in the order of 1-2 GB/s is a challenging problem. Such streams are encountered in backbone network routers, sensor networks and other domains like the financial services industry. This necessitates having sustained aggregate indexing rates of around 50-100 GB/s or more. Current multi-core architectures cannot sustain these high aggregate indexing rates.

This holds for similar multi-core architectures that may be employed in the future even though the architectures might have large number of cores. The current software indexing algorithms do not exploit fine-grain parallelism at the intra-document level and are not optimized for cache hierarchies when there are L1, shared L2/L3 caches with many threads per core and many cores. Therefore, scalability of text indexing with increasing simultaneous multi-threaded (SMT) threads per core and increasing number of cores is an important concern.

Simultaneous multithreading (SMT) is a processor design that combines hardware multithreading with superscalar processor technology to allow multiple threads to issue instructions each cycle. SMT permits all thread contexts to simultaneously compete for and share processor resources, and employs multiple threads.

SUMMARY

A system and method for indexing documents in a data storage system includes generating a single document hash table in storage memory for a single document using an index construction in a fine-grain multithreaded and scalable configuration wherein multiple threads are each assigned work to reduce synchronization between threads. An interval hash table is generated in storage memory for a plurality of single document hash tables. A global hash table is generated in storage memory for a plurality of interval hash tables such that single documents or portions thereof can be searched by employing the global hash table wherein the interval hash table and the global hash table maintain the index construction for the threads.

A method for generating a single document hash table includes partitioning a single document in storage memory and indexing strings of partitioned portions of the single document to create minor hash tables for the subparts of the document; generating a document level hash table in storage memory from the minor hash tables; updating a stream level hash table for the strings which maps every string to a global identifier; and generating a term reordered array from the document level hash table.

A system for indexing documents in a data storage system includes a plurality of processing cores configured to process threads in accordance with an indexing construction program. A hierarchical memory storage architecture is configured to store hash tables and processing results. The indexing construction program configured to assign an index construction to the threads. The index construction provides a fine-grain multithreaded and scalable configuration configured to generate a single document hash table for a single document wherein the threads are each assigned work to be performed by the plurality of processing cores to reduce synchronization between the threads. The indexing construction program may be further configured to generate an interval hash table in storage memory for a plurality of single document hash tables and to generate a global hash table in storage memory for a plurality of interval hash tables such that single documents or portions thereof can be searched by employing the global hash table wherein the interval hash table and the global hash table maintain the index construction for the threads.

A system and method for indexing documents in a data storage system includes generating a single document hash table in storage memory for a single document using an index construction in a fine-grain multithreaded and scalable configuration wherein multiple threads are each assigned work to reduce synchronization between threads. The single document hash table includes partitioning the single document and indexing strings of partitioned portions of the single document to create minor hash tables for the subparts of the document; generating a document level hash table from the minor hash tables; updating a stream level hash table for the strings which maps every string to a global identifier; and generating a term reordered array from the document level hash table.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
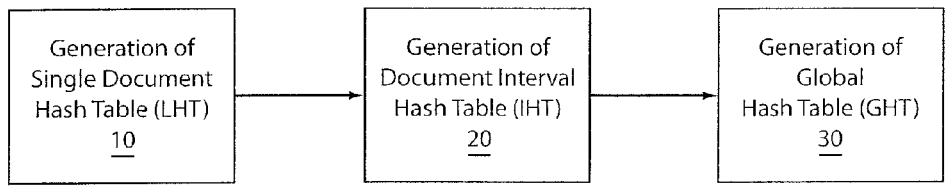
FIG. 1 is a block/flow diagram showing a system/method for indexing documents in accordance with one embodiment.

In accordance with the present principles, an optimized indexing method and system with multi-threaded cores are provided that include next generation multi-core and many-core architectures that are cache-aware and minimize synchronization overheads. The present embodiments include multi-threaded text indexing methods that provide strong scalability for indexing while maintaining and/or improving search performance. The design is cache-aware with explicit mapping of data-structures onto level 1, 2 and 3 (L1, L2, L3) caches and memory to optimize access latency costs and bandwidth usage. The design incorporates intelligent usage of interleaved intra-document and term-based partitioning to extract maximum parallelism and minimize synchronization overheads by using barriers only within a limited group of threads.

Multi-level pipelining is employed to maximize throughput along with staggered scheduling and double-buffering to hide memory latency costs. These design attributes provide particularly useful advantages for the present embodiments and assist in providing strong scalability and very high indexing throughput rates, e.g., on the order of 10-100 GB/s.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In accordance with the present principles, high throughput scalable indexing, e.g., for HTML data, is achieved and reduces indexing time. The present embodiments maintain search performance, but provide indexing throughput of about 1-2 GBps or higher per stream. Parallel scalable indexing is employed, which includes a scalable fine grained multi-threaded text indexing method that minimizes synchronization requirements. Optimized mapping of data structures is performed onto L1, L2, L3 caches and main memory.

The architecture employs Processing Elements (PEs) or processing cores which include N cores. The cores are k-way simultaneously multi-threaded on a p stage processor pipeline, where k is the number of threads and p is the number of stages. The memory hierarchy may include a private L1 D-Cache per core, and higher levels of private or shared cache such as L2, L3 are preferred. A shared or distributed main memory is also employed.

Referring now to the drawings in which like numerals represent the same or similar elements and initially to FIG. 1, a high level block diagram shows an overview of a system/method for text indexing in accordance with one illustrative embodiment. In block 10, a single document index, called local hash table (LHT) is generated. A single document is parsed and an index is created for all its unique strings. First, a document level Hash Table (dlHT) is created which is then converted into a serialized array called a Term Reordered Array (TRA). The strings are also updated in a stream level Hash Table (slHT). The slHT maps every string to a unique stream level identifier known as a GId (Global Identifier). The document is preferably processed in 4 stages using 4 cores. Each stage has a fine-grain multi-threaded design for optimal performance. It should be understood that the design of the work partitioning and orchestration across the threads is performed in a way to minimize synchronization across the threads.

Figure 2:
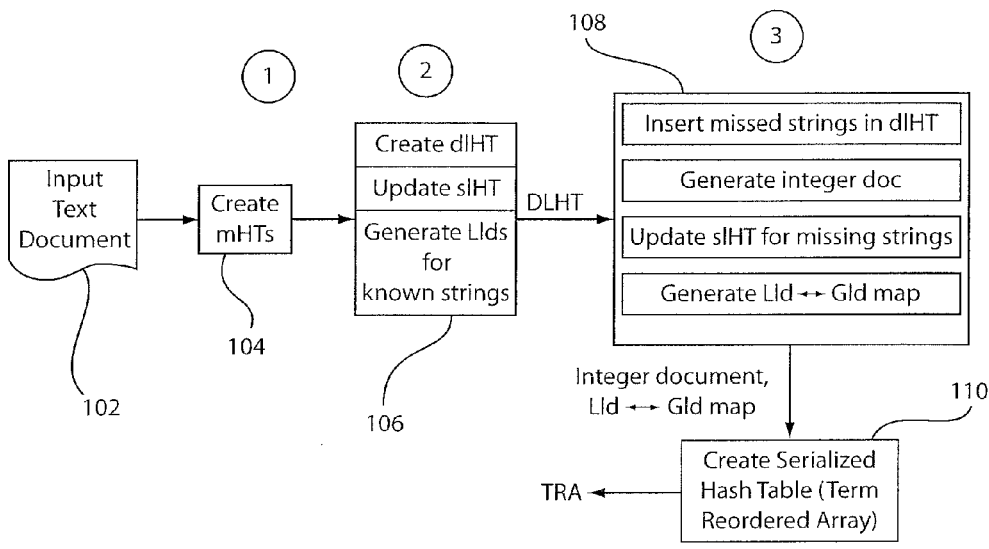
FIG. 2 is a block/flow diagram showing generation of a local hash table (LHT) in accordance with one embodiment.

Referring to FIG. 2, a more detailed block diagram shows the generation of the LHT as described in block 10 of FIG. 1. In block 102, a text document is input. In block 104, a minor Hash Table (mHT) is created by a first core (indicated by the circled number 1). By way of example, indexing a text document permits the document to be searchable by, e.g., a search engine or the like. In one illustrative example, a Lucene™ index may be employed to cover a set of documents. A document is a sequence of fields. A field is a sequence of terms. A term is a text string. A Lucene™ index consists of one or more segments. Each segment covers a set of documents. Each segment is a fully independent index (e.g., document streams maintain their own indexes), and index updates are preferably serialized.

Figure 3:
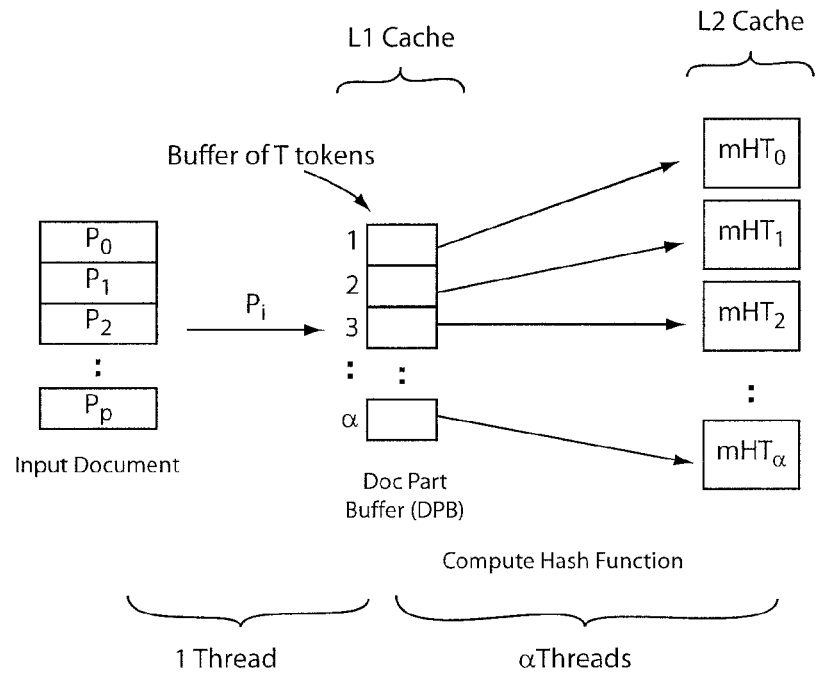
FIG. 3 is a block/flow diagram showing the generation of a minor hash table (mHT) in accordance with one embodiment.

Referring to FIG. 3, the input document (D) is divided into p parts ($P_i$, $i \in \{1, \ldots, p\}$), each consisting of T tokens, i.e. $|P_i|=T$. A thread reads a $P_i$ into the Document Part Buffer (DPB) in. e.g., a level 1 cache (L1). The DPB may be double buffered. The DPB is partitioned across a threads. Each thread creates a hash table corresponding to document subpart it is processing, called minor Hash Table (mHT).

Figure 4:
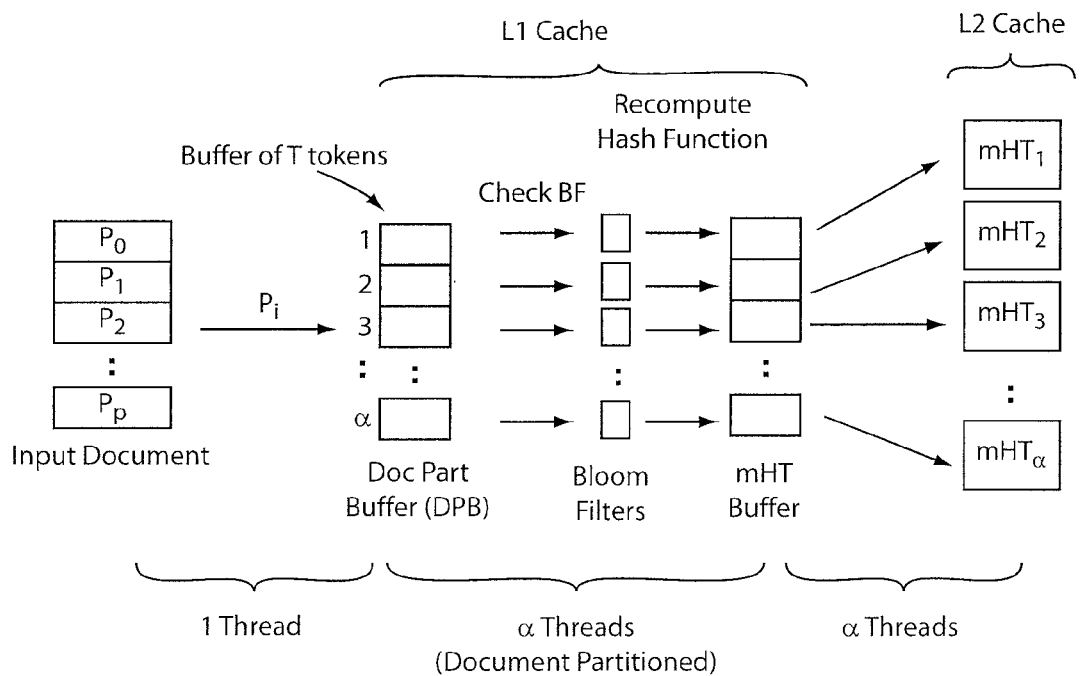
FIG. 4 is a block/flow diagram showing the generation of a minor hash table (mHT) with optimized design flow including Bloom Filters in accordance with another embodiment.

Referring to FIG. 4, in an alternate embodiment, improved design flow may be achieved over that of FIG. 3. Some performance optimizations may include reducing the overhead for checking of strings to see if they are already inserted in the mHT. Bloom filters BF (FIG. 4) may be used for doing a set membership query and provide low constant query response time. Bloom filters (BF) reduce hash table access overheads and provide highly optimized membership query response time. The usage of BFs leads to false positives which are handled in later stages. Another possible optimization is in the access of mHTs. mHTs may not be fit into L1 cache and have to be stored in L2 cache. mHTs are accessed repeatedly (once for every string parsed in the document). To reduce the overhead of accessing L2 cache, a buffer (mHT buffer) on L1 may be maintained where strings to be inserted into mHT are written.

This mHT buffer is written to the L2 by a separate set of threads (α threads) to provide the double buffering. Another optimization may include eliminating the need for synchronization for mHTs as they are simultaneously written into (in block 104 in FIG. 2) and read from (in block 106 in FIG. 2).

Figure 5:
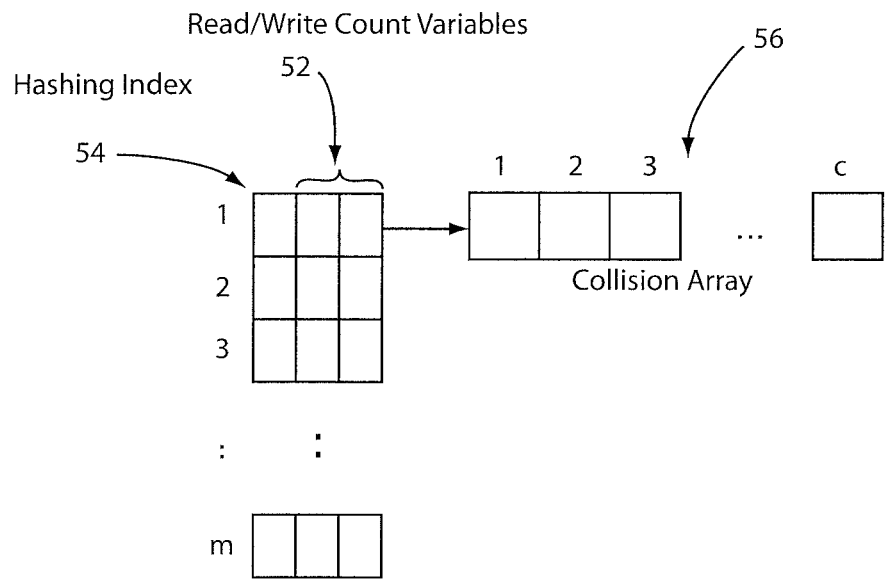
FIG. 5 is a block/flow diagram showing an illustrative structure of a minor hash table (mHT) in accordance with one embodiment.

Corresponding to each hashing index, two read/write count variables are maintained (see, e.g., FIG. 5). These are employed to enable simultaneously writing to and reading from the same mHT and are achieved without the need for any explicit synchronization mechanisms like locks, etc.

Referring to FIG. 5, an illustrative structure mHT structure is depicted. The read write count variables 52 may be stored in a position associated with a hashing index 54. Each hashing index 54 is associated with a collision array 56. The count variables 52 can be updated and compared to determine the synchronization of accesses, states or other operations. The work partitioning and orchestration across the threads is preferably arranged to minimize synchronization between the threads.

Referring again to FIG. 2, a document level hash table (dlHT) is created, a stream level hash table (slHT) is updated and LIds are generated at a second core (core 2 indicated by a circled 2 in FIG. 2) in block 106. mHTs created in block 104 are merged to create the document level Hash Table (dlHT).

Figure 6:
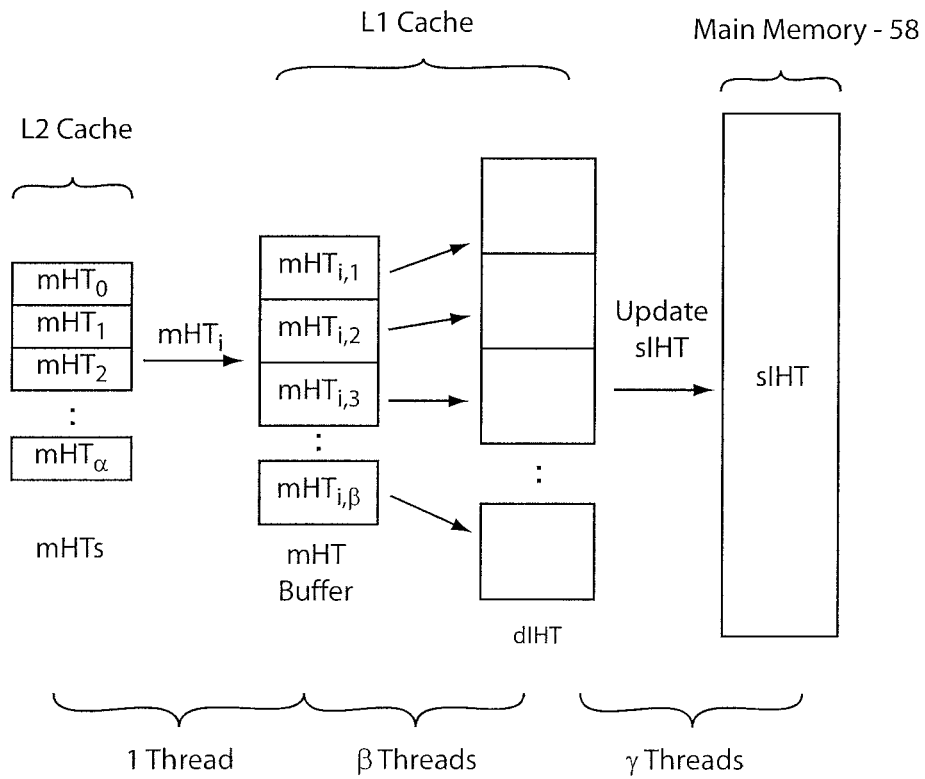
FIG. 6 is a block/flow diagram showing the generation of a document level hash table (dlHT) and updating of a stream level hash table (slHT) in accordance with one embodiment.

Referring to FIG. 6, block 106 is shown in greater detail. A document level unique integer identifier (LId) is generated for each string and stored along with it in the dlHT. The strings in the dlHT are also updated into the stream level Hash Table (slHT). Each document stream has a unique slHT. slHT provides a mapping between the strings that appeared in the document stream and a stream level unique integer identifier, known as a Global Id (GId). The slHT may be stored in main memory 58. mHTs, which may be stored in the L2 cache, are read using a single thread into a L1 cache buffer (mHT buffer). The mHT buffer in the L1 cache is term-partitioned across β threads such that each thread reads one of the partitions of the mHT buffer and inserts its strings into the dlHT (also in the L1 cache). Further, γ threads are used to parse the dlHT and update the strings into the slHT in main memory 58.

Figure 7:
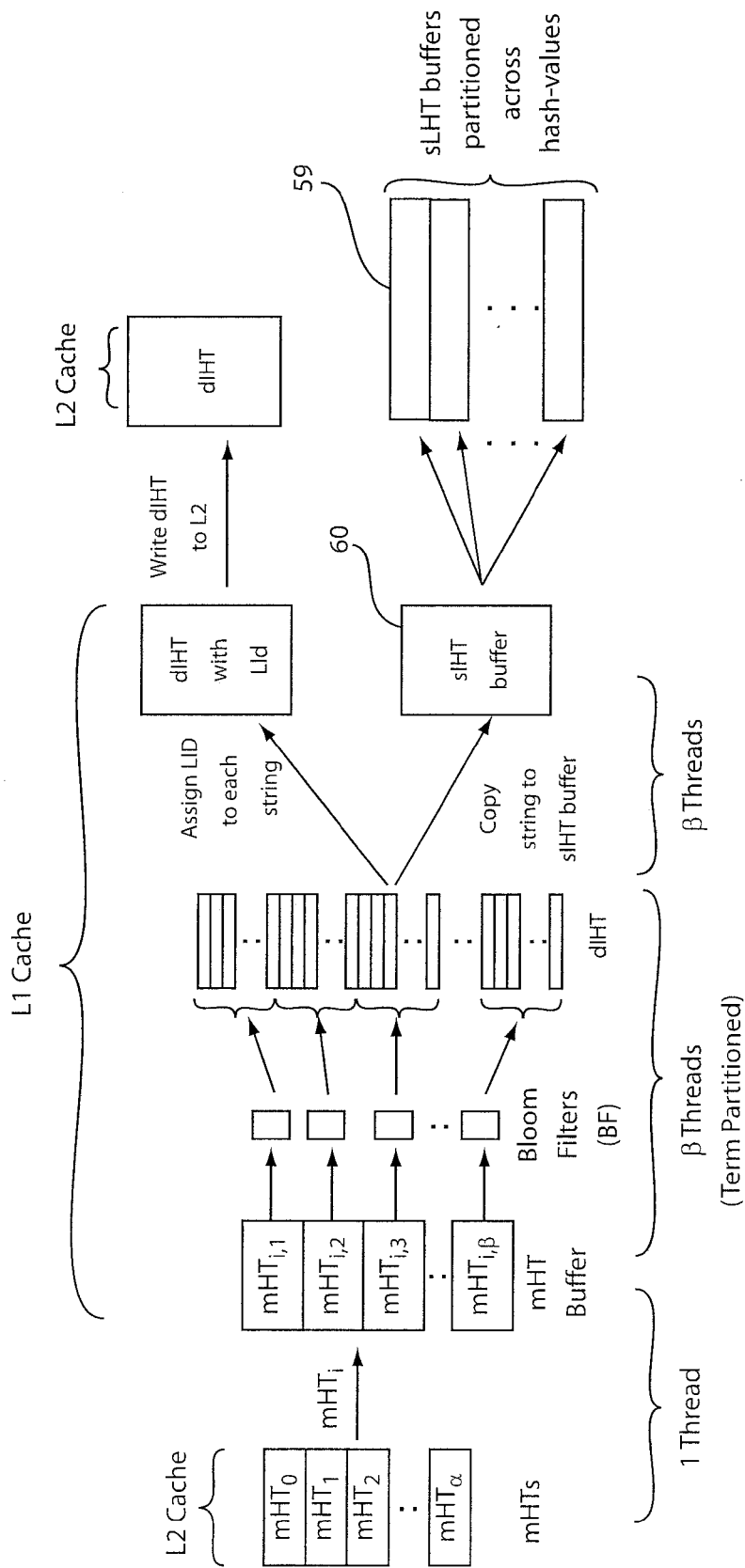
FIG. 7 is a block/flow diagram showing more details of FIG. 6 for the generation of a document level hash table (dlHT) and updating of a stream level hash table (slHT) using partitioned hash values in accordance with another embodiment.

Referring to FIG. 7, in an alternate embodiment, improved design flow may be achieved over that of FIG. 6. Performance optimizations may include reducing the overhead involved in checking of strings in mHT to see if they are already inserted in the dlHT while merging mHTs into the dlHT. As in the creation of mHTs, bloom filters can be employed here for a low constant response time for set membership queries.

Another performance optimization involves assigning unique identifiers to each string in dlHT using multiple threads. β threads are employed to assign LId to each string by term partitioning the dlHT among these β threads. Each thread independently computes a total of number of strings. They then perform cumulative sum of the count using a reduce operation, after which they can independently assign LId to the strings. The strings inserted in dlHT are also be updated in the slHT. The β threads which parsed the dlHT to assign LIds also write the strings parsed into a slHT buffer 60. A separate set of threads 59 read slHT buffer 60 to update the slHT.

Figure 8:
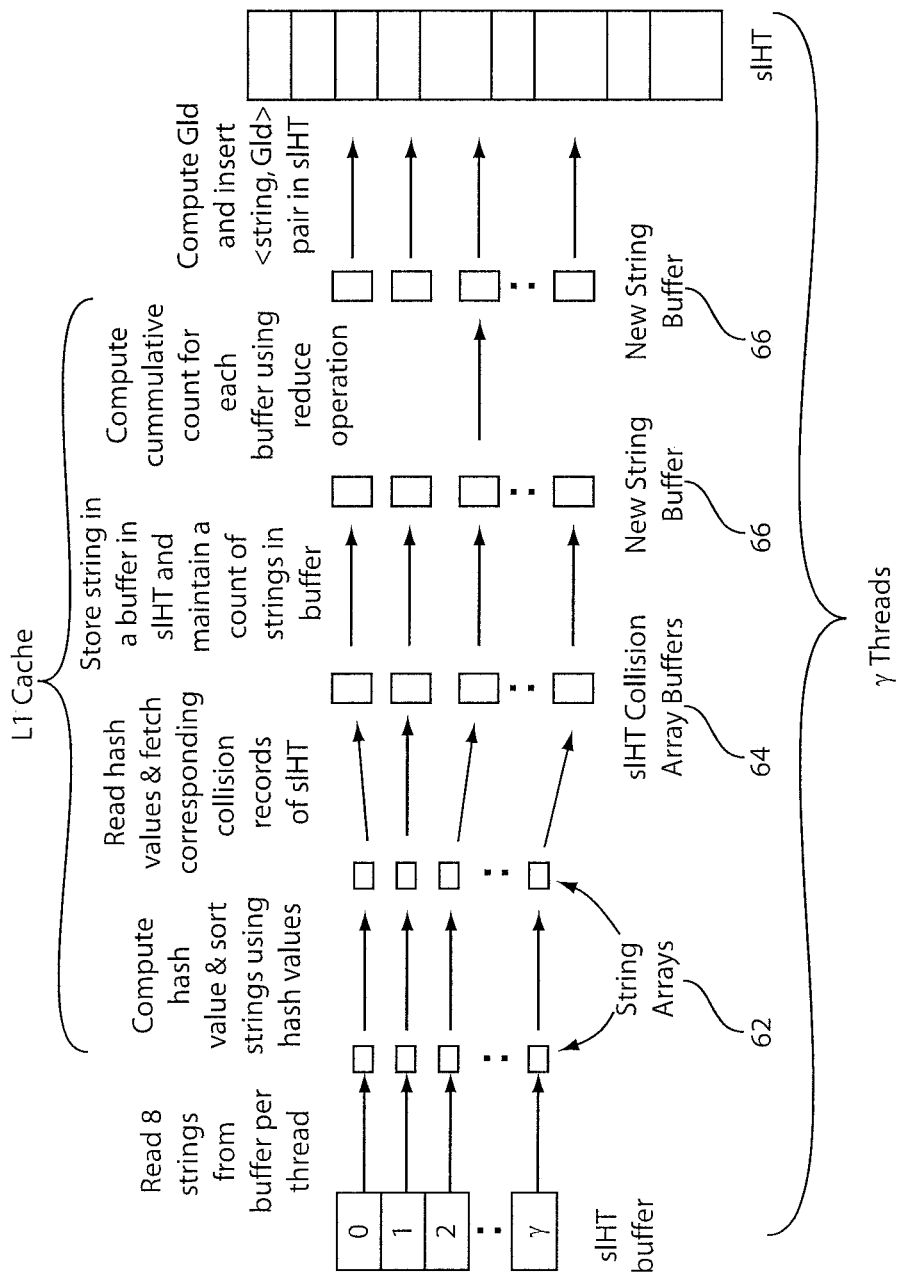
FIG. 8 is a block/flow diagram showing the updating of a stream level hash table (slHT) of FIG. 7 in greater detail using a plurality of threads associated with slHT buffers partitioned in accordance with hash values.

Referring to FIG. 8, in embodiment of FIG. 7, the design flow for updating the slHT in accordance with FIG. 7 is shown in greater detail.

Updating of the strings in the slHT involves querying the slHT to check whether or not the string is already present. If it is not present the string is assigned a unique identifier called a Global Identifier (GId) and inserted into the slHT. Referring again to FIG. 6, the slHT is stored in main memory 58. Thus, it involves not only overheads in querying the slHT but also synchronization overheads to assign GIds to the strings. To reduce these overheads, in this embodiment the slHT buffer 60 is partitioned among γ threads. Each thread reads a set of strings from the buffer into an array 62 in L1 cache. The hash value for each string in the array is computed and the strings are sorted in the array based on their hash values. For each hash value, the corresponding collision array from the slHT is fetched into the slHT collision array buffer 64 in L1 cache. The strings are sorted based on their hash values to avoid redundant fetching of the same collision arrays. The strings from the string array 62 are read and the collision array buffer 64 is checked if the string is present or not. If it is present, the string is discarded, or else it is inserted into a new string buffer 66. A count is maintained on the number of strings inserted in each new string buffer 66. Then, the cumulative sum of the count is calculated by the all the threads using a reduce operation. Each thread can now independently assign GId to the strings in its new string buffer 66 and insert it into the slHT.

Referring again to FIG. 2, in block 108, missed strings are inserted in the dlHT, an integer document is generated, slHT is updated for missing strings and a map is generated between LIds and GIds at a third core (core 3 indicated by a circled 3 in FIG. 2). The integer documents and map are output from stage 3.

Figure 9:
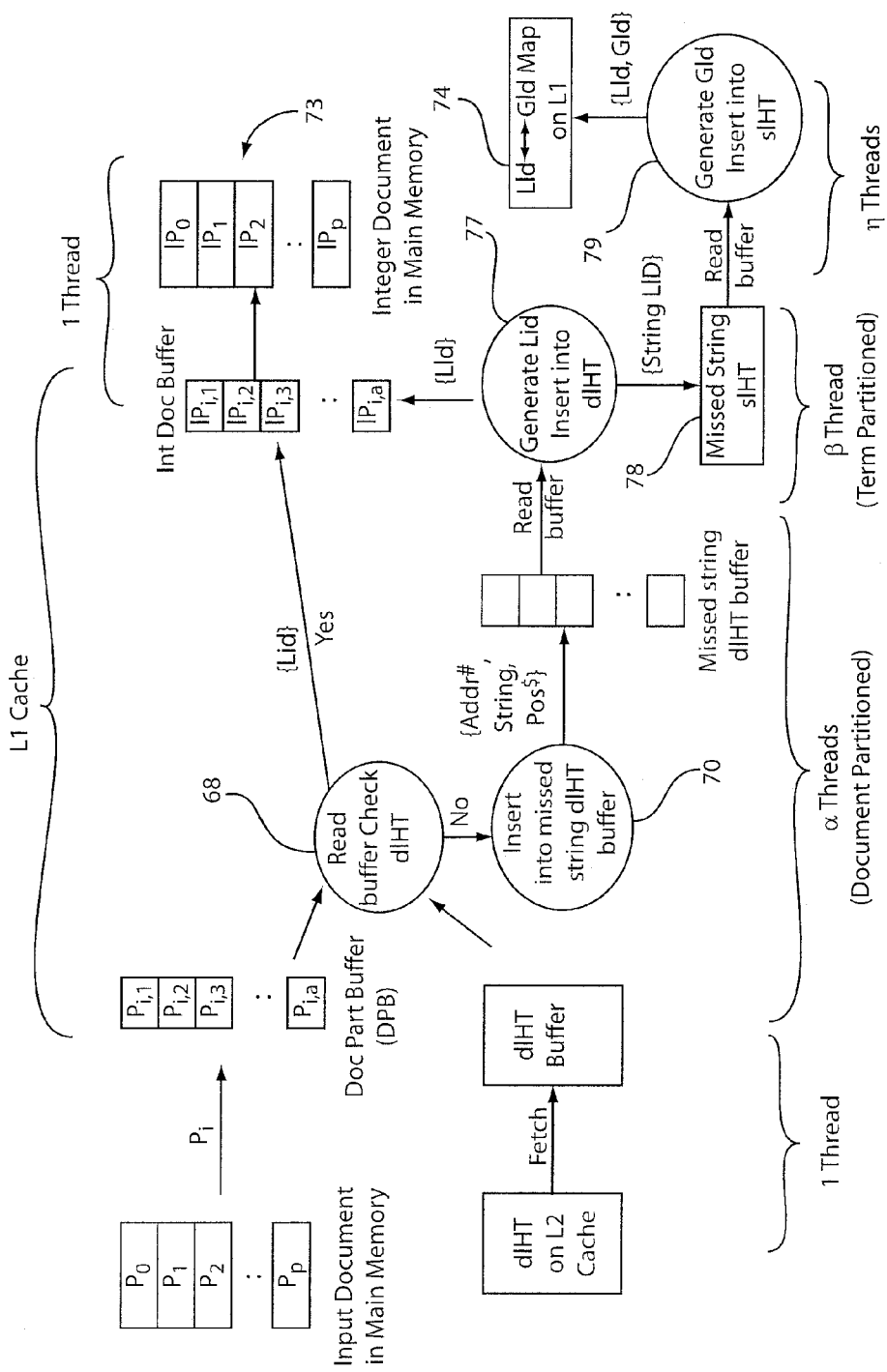
FIG. 9 is a block/flow diagram showing the generation of an integer document and LId to GId map in a last stage of FIG. 2 in accordance with an illustrative embodiment.

Referring to FIG. 9, block 108 is shown in greater detail. dlHT and slHT are updated with any missing strings. Due to false positives of Bloom Filters (BF) some strings are missed and not inserted into the hash tables. To find out the missing strings, the input document is read again. As done during the creation of mHTs, the input document is partitioned and the partitions are read into the Document Part Buffer (DPB) in L1 cache. The dlHT is also fetched from L2 into a dlHT buffer in L1. The DPB is partitioned across a threads. Each thread parses the DPB and checks if the string is present in the dlHT in block 68. If a string is missing, it is inserted into a buffer called the missed string dlHT buffer in block 70 so that it can be inserted into the dlHT and slHT later. However if the string is present, its LId is read from the dlHT buffer and inserted into Integer Document Buffer (IDB) at the same position as the position of the string in the DPB. Thus, an IDB is generated for each DPB processed. Later the IDB is written into the integer document 73 in the main memory. An LId↔GId map 74 is generated. The integer document 73 and the LId↔GId map 74 are employed to create the LHT for the document.

Missed strings are added using a missed string dlHT buffer in block 77. In block 78, the missed string dlHT buffer is term partitioned across β threads. Each of these threads parses the buffer. For each string, a LId is generated. The string and the LId are inserted into the dlHT as described. The LId is also written into the IDB. The string and LId pair is also written into a buffer called missed string slHT buffer for updating the slHT. The slHT buffer is updated for missing strings in block 79. The slHT buffer is term partitioned across a set of η threads and each of these threads parses the buffer. For each string, a GId is generated. The string and the GId are inserted into the slHT as described. These threads also insert the GId for each string into an array called LId-GId map 74 which is indexed using the LId. The integer documents 73 and LId-GId map 74 are output.

Referring again to FIG. 2, in block 110, a serialized hash table (a term re-ordered array (TRA)) is created using the integer document 73 and the map 74 at a fourth core (core 4 indicated by a circled 4 in FIG. 2). It should be noted that the present embodiments permits multi-level pipelining. In one embodiment, multi-level pipelining includes at least two levels of pipelining. For example, in FIG. 2, a first pipeline exists across documents when one document is converted into an integer document in block 108 (core 3) and this integer document enters block 110 (core 4) then the next document enters block 104 (core 1). These documents belong to the same stream. A second pipeline includes intra-document level pipelining. When one part of the document has entered block 106 (core 2), then the second part of the document enters block 104 (core 1).

Figure 10:
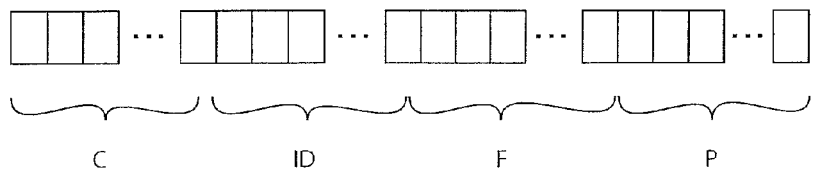
FIG. 10 is a diagram showing an illustrative formatting for a term reordered array (TRA) in accordance with an illustrative embodiment.

Referring to FIG. 10, block 110 is described in greater detail. A term reordered array format is illustratively shown. The letters indicated in FIG. 10 correspond to the following. $C_i$=Number of distinct words mapped to $i^{th}$ hash table entry. ID→GId of the words in order of their hash value. F→Frequency of words in the document. P→Position of words in the document. The order of frequency and position appearance is the same as the order of GId in the array ID. |C|=Hash Table size; |ID|=|F|=Number of distinct words in document; |P|=Number of words in document. The dlHT created in block 108 is converted into a linear serialized array called a TRA. The TRA facilitates parallel and fast reading of hash tables.

Figure 11:
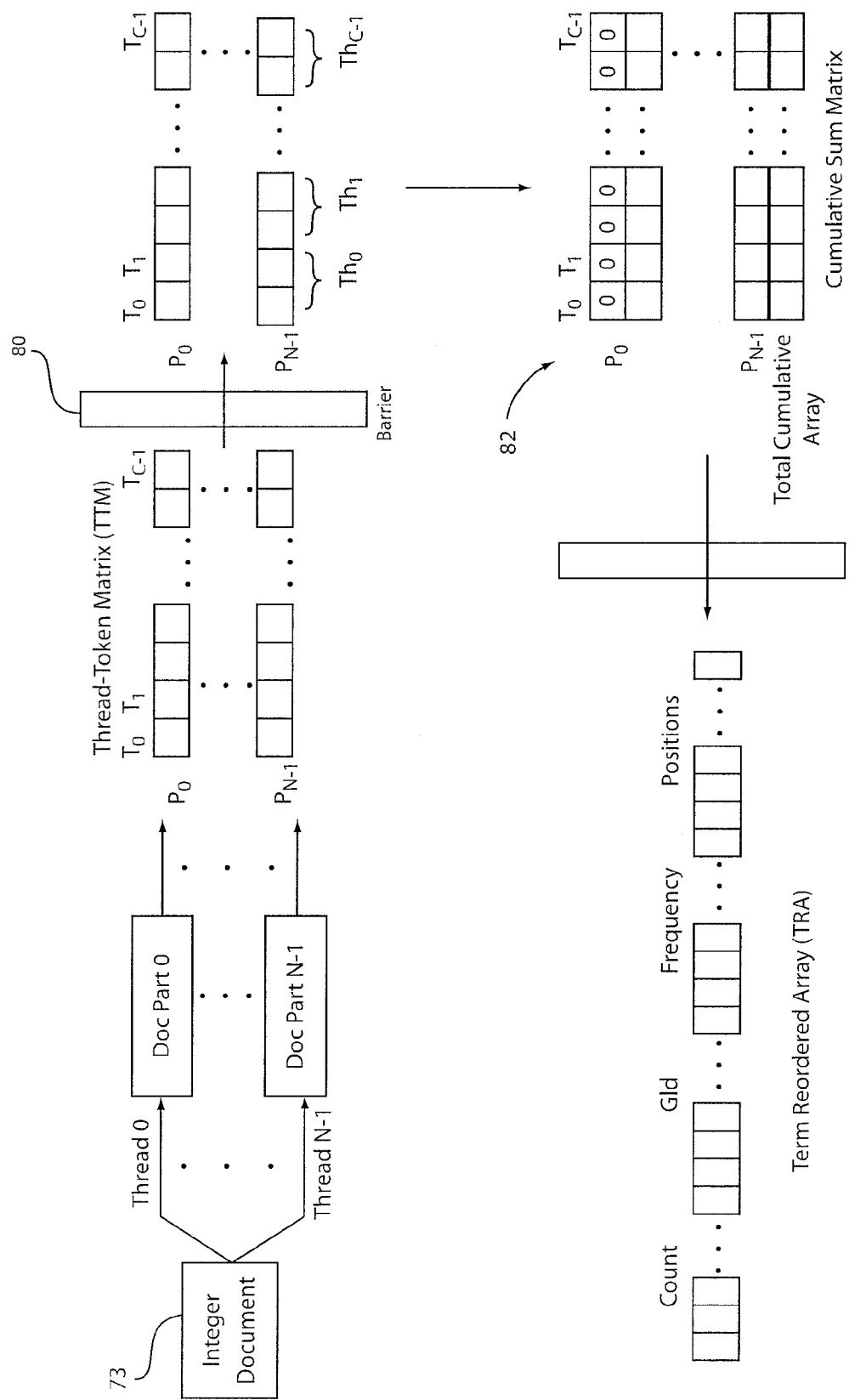
FIG. 11 is a block/flow diagram showing the generation of a term reordered array (TRA) in accordance with an illustrative embodiment.

Referring to FIG. 11, the TRA is created from the integer document 73. The integer document is partitioned across N threads. Each thread parses the document part and fills up the number of occurrences of the tokens in a thread-token matrix (TTM). A barrier 80 may be used. Each thread accesses a particular row in the TTM, and the columns are indexed by the token id. Once all the threads complete parsing, the document parts fill up the TTM, a cumulative sum matrix 82 is computed by computing cumulative sum for each token along the columns in the TTM. To carry out this computation, the TTM columns are partitioned across N threads as shown in FIG. 11. The cumulative sum matrix 82 is used to generate the TRA.

First, a single thread is used to fill up the Count (C), GId (ID) and Frequency (F) portions of the TRA (FIG. 10). Then, N threads are used to parse the N integer document parts and fill up the Positions (P) (FIG. 10) portion of the TRA using the cumulative sum matrix.

Referring again to FIG. 1, a TRA for the single document hash table (LHT) is created in block 10. Block 10 provides bloom filters for reducing hash table access overheads, provides highly optimized membership query response time, fine grained multi-threading, provides document and term-wise partitioning to extract maximum parallelism, and results in a highly scalable method for processing threads. The scalability occurs with increased numbers of threads and cores. The cache consciousness is achieved by explicit mapping of data structures onto L1, L2, L3 and memory. Minimal synchronization is needed since no explicit synchronization is required across the threads except for global barriers.

Processor cores with pipelining are organized in stages which can independently or semi-independently work on separate jobs. Each stage is organized and linked into a chain so each stage's output is fed to another stage until the job is done. This organization of the processor allows overall processing time to be significantly reduced. In accordance with the present principles, several levels of pipelining can be maintained concurrently. These levels may be divided up in a number of ways. In one example, the present structure for block 10 includes multi-level pipelining having intra-document and inter-document pipelining. Other levels may also be employed.

Computation and communication are overlapped since double buffering is provided, e.g., to hide L2, L3, memory latency. Thread scheduling is preferably performed in a staggered fashion to hide L2, L3, memory latency.

Scalability for an increased number of threads can be provided for a same document size. Memory may be needed for data structures like bloom filters. An increased number of threads can be provided for increasing document sizes. Also, memory needed for all data structures increases proportionally to the increase in document size.

In block 20, a document interval hash table (IHT) is generated. In one embodiment, 256 LHT's are merged into a single IHT. IHT provides a mapping of the terms and the documents in which they appear. IHT includes pointers to corresponding LHTs which includes the term. 256 LHTs are merged together to form a single IHT. This includes multiple threads reading an LHT in parallel and merging in IHT. This parallelism employs term-wise partitioning. The LHTs are continuously streamed in to be merged.

Figure 12:
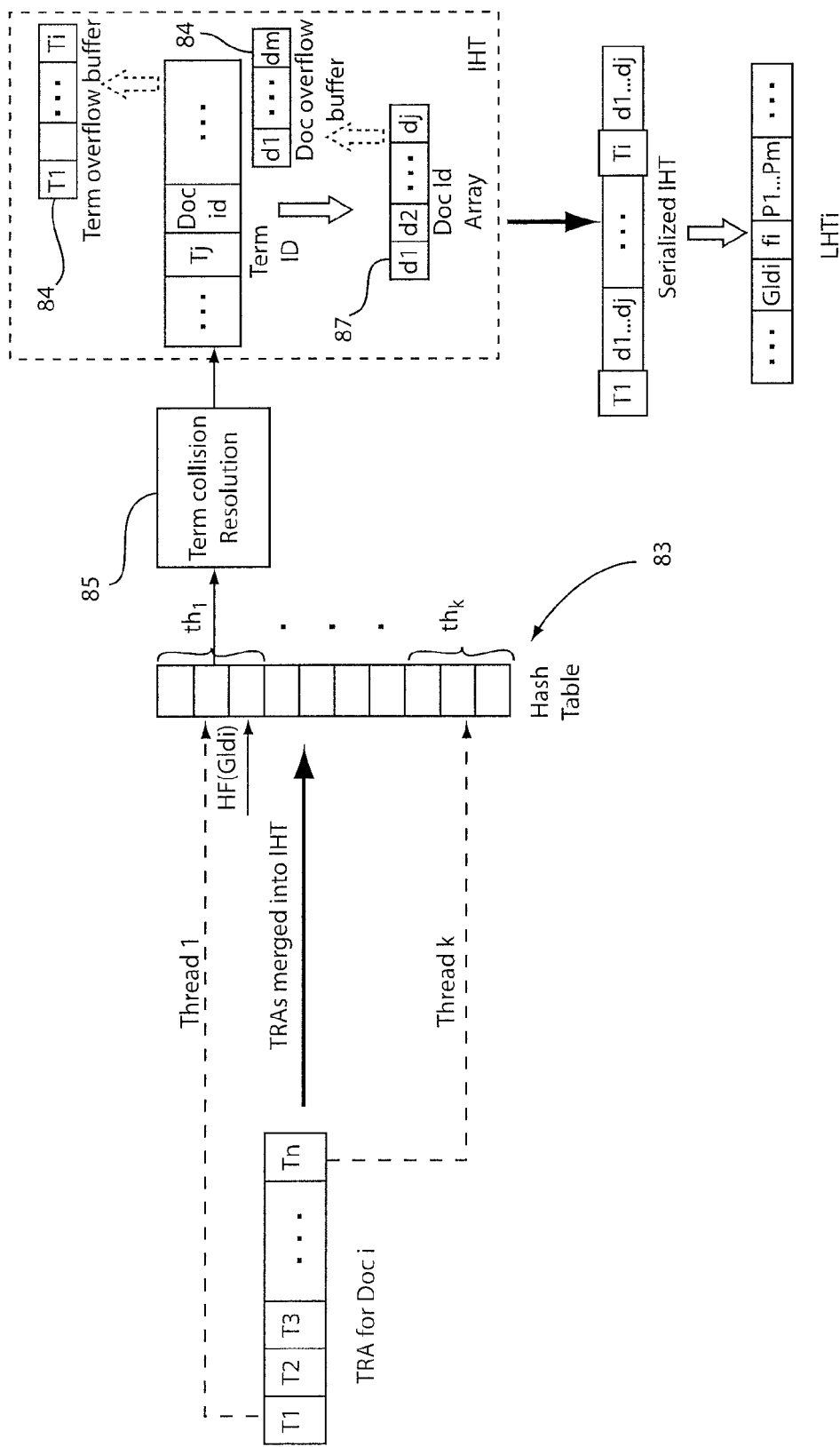
FIG. 12 is a block/flow diagram showing the merging of TRAs to create an interval hash table (IHT) in accordance with an illustrative embodiment.

Referring to FIG. 12, block 20 is shown in greater detail where a TRA for a document is merged into an IHT. The TRA is retrieved from main memory into the L1 cache. The TRA is merged into an IHT section in L1 which is then merged into the IHT in L2 cache which is later stored in main memory. A TRA is merged into the IHT using multiple threads. The hashing index range is partitioned across these threads such that each thread reads the entire TRA, computes the hashing function using the GId for each term but merges only those terms into the IHT whose computed hash value lies in the range assigned to the thread. Each thread populates a collision array 83 at the hashing index of each of its corresponding terms. Term collision resolution is performed in block 85. The IHT contains the Term ID and the Doc IDs of all the documents in which the term appears. Overflow buffers 84 are provided for Term IDs (Term overflow buffer) and document IDs (Doc overflow buffer) for document ID array 87. The IHT and the overflow buffers are merged into a serialized IHT array for fast access.

Fixed memory is allocated for documents per term and terms per index of the IHT on which the threads work independently. If any collision array 83 associated with an index overflows, an overflow buffer 84 is employed. The overflow buffer 84 is also of fixed size. The fixed size IHT allocation and overflow buffers are used to minimize the memory allocation.

The performance optimizations used for merging of LHTs into the IHT are: (a) Multithreaded implementation where the range of hash indices of the IHT is partitioned across the threads and each thread reads the entire LHT but merges only those terms within its range of hash values. This also ensures that a thread can operate on subsequent LHTs without having to wait for other threads to finish the present LHT, (b) Distributed data structures where the IHTs contains only the terms, references to the documents where the term occurs and pointers to the position data of the term which is physically stored in the LHT, and (c) Scalability can be improved for increasing levels of cache hierarchies such as L1, L2 and L3 by hiding the cache access latencies using pre-fetching (multi-buffered communicate-compute overlaps).

Referring again to FIG. 1, a Global Hash Table (GHT) is generated in block 30. The GHT is the topmost level in the hierarchy of data structures and is used directly for search operations. Term IDs for the search strings are obtained using the slHT. The GHT is accessed using these Term IDs ($T_i$). In one embodiment, 256 IHTs may be merged into a single GHT.

Figure 13:
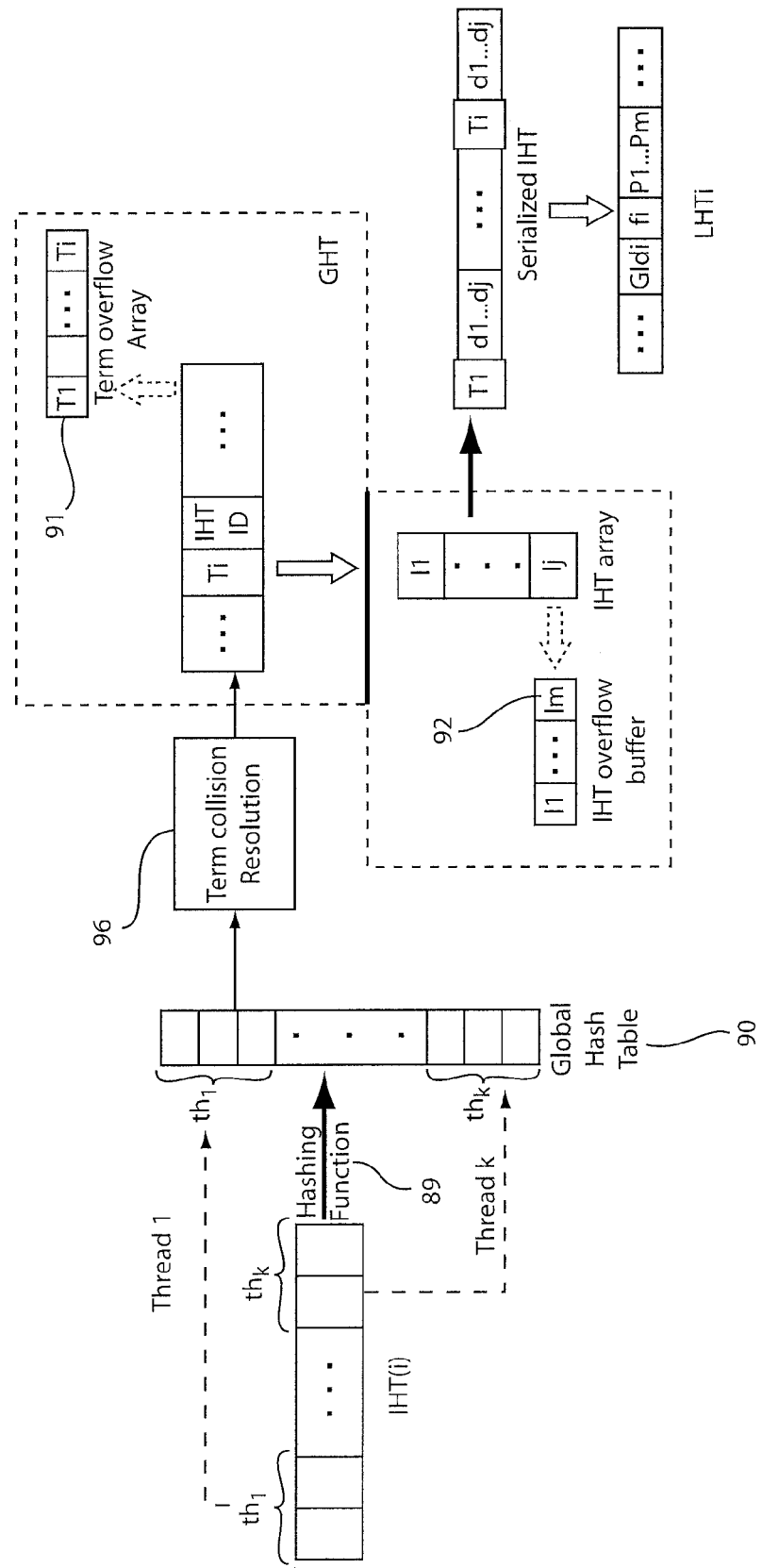
FIG. 13 is a block/flow diagram showing the merging of IHTs to create a global hash table (GHT) in accordance with an illustrative embodiment.

Referring to FIG. 13, a GHT is generated (block 30, FIG. 1) from a plurality of IHTs. IHTs are merged together to form the GHT using a separate core (e.g., a fifth core or under used one of the four cores described earlier). Hash values of an IHT are partitioned across the threads ($th_1 \ldots th_k$). Different portions of IHT are read and merged into GHT in parallel. Hashing 89 is done on the Term IDs and a collision array 90 is populated. Term collision resolution in performed in block 96. Overflow buffers 91, 92 are provided for Term IDs and IHT IDs, respectively.

In a particularly useful embodiment, IHT sections are merged into GHT sections using an L1 cache where the IHT is stored in L2 cache from main memory. The GHT sections which are merged in L1 cache from the IHT sections are stored in L2 cache and sent to L3 cache. The GHT sections in L3 cache are sent to main memory. Other cache schemes may also be employed. The merging of IHTs into the GHT employ similar performance optimizations as the merging of LHTs into an IHT, namely multithreaded implementation, distributed data structures and ensured scalability with increasing memory hierarchy.

Figure 14:
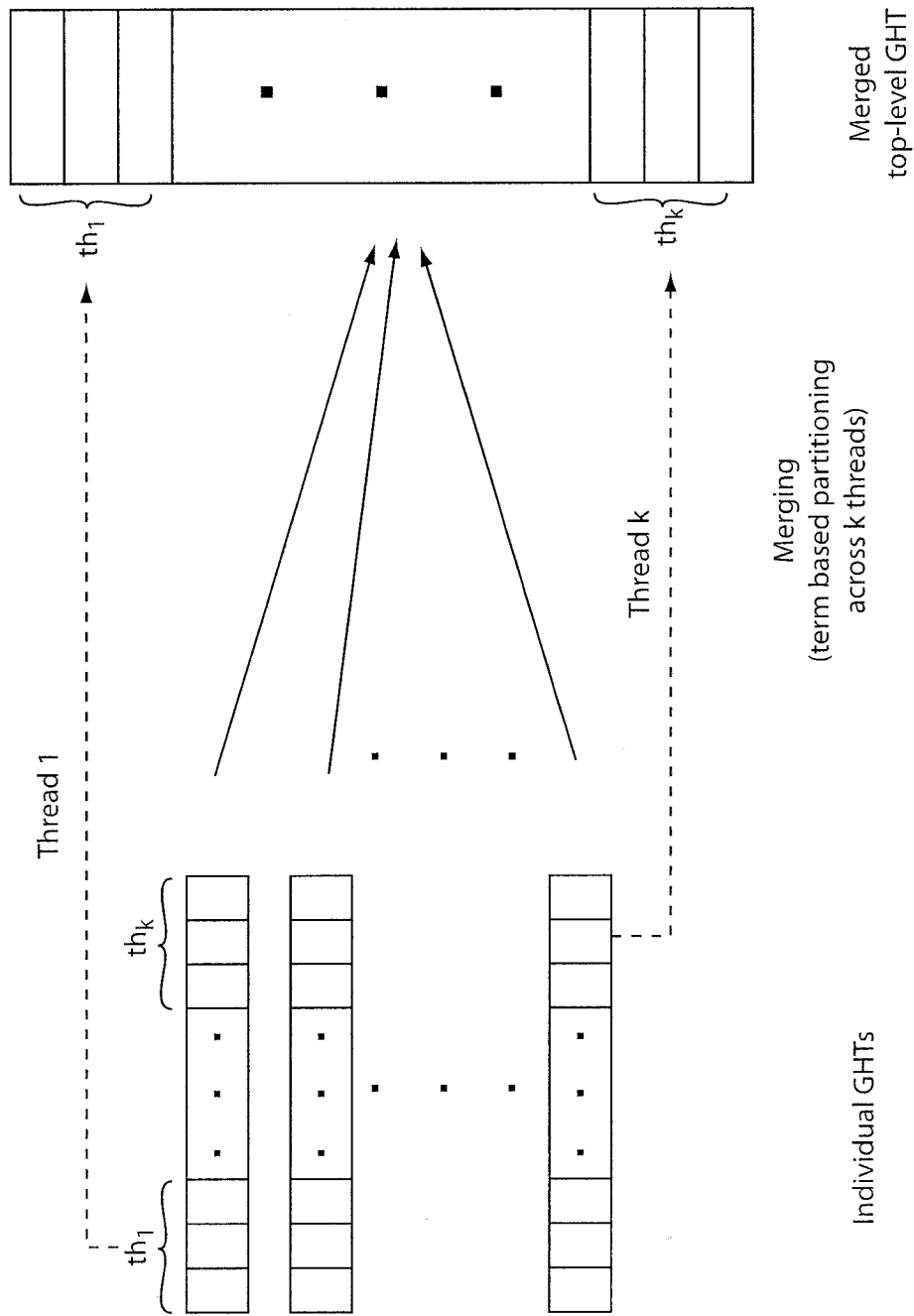
FIG. 14 is a block/flow diagram showing the merging of GHTs to create a top-level GHT in accordance with an illustrative embodiment.

Referring to FIG. 14, scalability with an increasing number of cores may be accommodated by dividing a stream into multiple sub-streams and processing each sub-stream using the flow depicted in FIG. 1. Each sub-stream creates a GHT which is referred to as a minor GHT (mGHT) but they all share a single slHT. In this embodiment, a plurality of mGHTs is merged in a top-level GHT. Merging of mGHTs may include taking a plurality of individual mGHTs and merging them using term based partitioning across k threads ($th_1 \ldots th_k$) to provide the merged top-level GHT.

Figure 15:
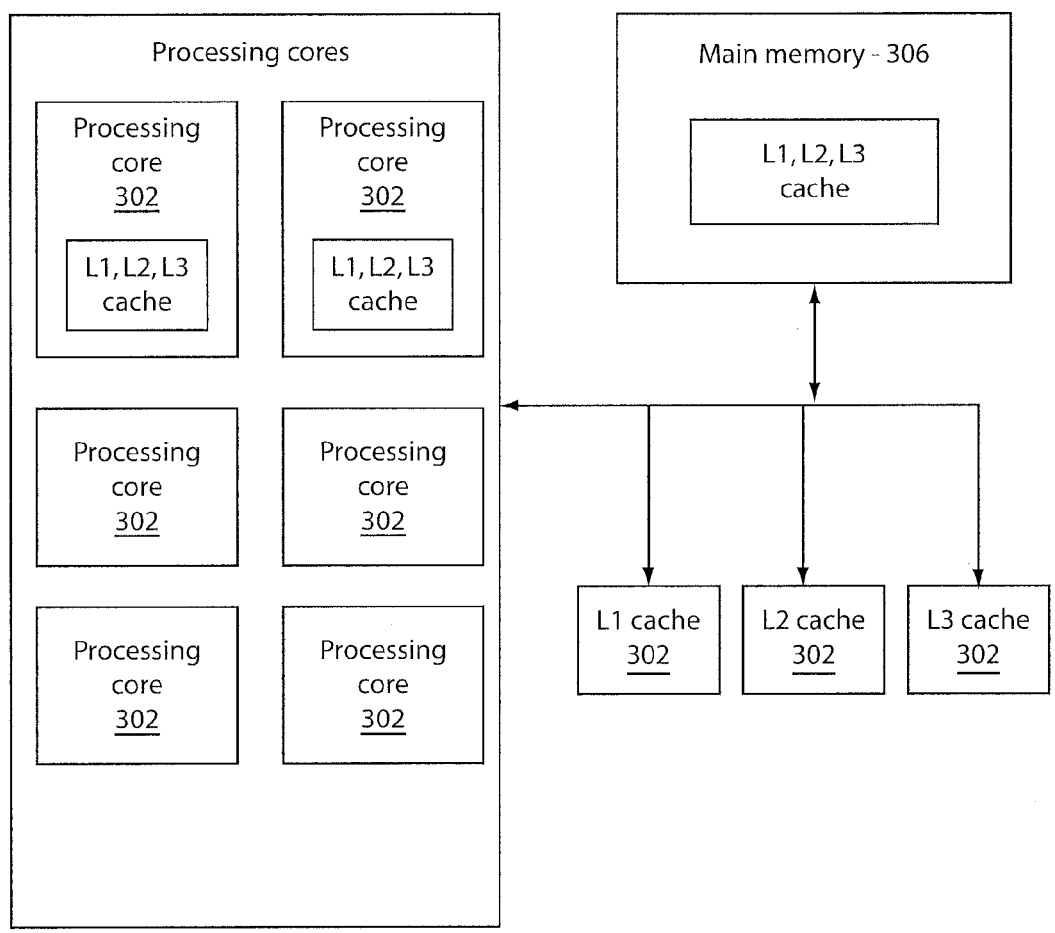
FIG. 15 is a block diagram showing an illustrative system that may be employed to run indexing methods in accordance with the present principles.

Referring to FIG. 15, the present principles provide a highly scalable fine-grain multithreading system 300 for high throughput text indexing. System 300 includes a plurality of processing cores 302 arranged in a multi-core or many-core multi-threaded architecture. Each processing core or core 302 is capable of multi-thread execution. Synchronization is provided within well-defined boundaries (e.g., within each of the LHT, IHT or GHT regions or e.g., within a given cache level, etc.) and eliminates the need for usage of explicit synchronization strategies like locks, semaphores, transactional memory. The cache conscious multi-threaded design provides explicit mapping of data-structures onto caches at different levels of a hierarchy such as L1, L2 and L3, and main memory 306. High indexing throughput of the order of GBps is achievable. It should be understood that the cache memory (L1, L2, L3) may be located at a processing core 302, in main memory 306, and/or external to the main memory 306 and the processing cores 302.

The systems and method are highly scalable. With increasing number of hardware threads intra-document and term based partitioning is provided to extract maximum parallelism. Inter-leaved intra-document and term based partitioning is also provided. With increasing number of cores, multi-level pipelining is provided. For example, level 1 provides inter-document level pipelining and level 2 provides intra-document level pipelining and pipelined intra-document partitioned threads and term partitioned threads. In particularly useful embodiments, massive amounts of data and data searches are achievable in real-time will be imperative in future. The present principles provide applications for indexing and search performance on multi-core architectures which add market value to data mining and search products.

Having described preferred embodiments of a system and method for multithreaded text indexing for next generation multi-core architectures (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for indexing documents, comprising:
generating a single document hash table in storage memory for a single document using an index construction in a multithreaded and scalable configuration wherein multiple threads per processing core are each concurrently assigned work to reduce synchronization between threads wherein generating a single document hash table includes:
partitioning the single document into a plurality of subparts and indexing strings of partitioned subparts of the single document to create a minor hash table for each subpart;
generating a document level hash table from the minor hash tables;
generating an interval hash table in storage memory for a plurality of single document hash tables; and
generating a global hash table in storage memory for a plurality of interval hash tables such that single documents or portions thereof can be searched by employing the global hash table wherein the interval hash table and the global hash table maintain the index construction for the threads;
updating a stream level hash table for the strings which maps every string to a global identifier, wherein the multiple threads per processing core are configured to read the strings from a buffer into the stream level hash table; and
generating a term reordered array from the document level hash table.

2. The method as recited in claim 1, wherein generating the single document hash table includes generating the single document hash table in a plurality of stages wherein each stage is performed by a separate core.

3. The method as recited in claim 1, wherein the minor hash tables are created using bloom filters.

4. The method as recited in claim 1, wherein the minor hash tables include a plurality of read/write count variables which are employed to synchronize simultaneous writing and reading operations from a same minor hash table.

5. The method as recited in claim 1, wherein updating the stream level hash table for the strings which maps every string to a global identifier includes mapping between strings appearing in the single document and the global identifier to form a document level identifier to global identifier map.

6. The method as recited in claim 1, wherein updating the stream level hash table includes:
fetching collision records of the stream level hash table;
computing cumulative counts for terms in the single document for string buffers using a reduce operation; and
updating the stream level hash table using threads partitioned by a hash index.

7. The method as recited in claim 1, wherein generating the term reordered array from the document level hash table includes:
partitioning an integer document which is generated by storing document level identifiers for each string;
computing a cumulative sum matrix for terms for each partitions of the integer document and for all the threads; and
generating the term reordered array for the single document where counts, global identifiers, frequency and position are formatted in the term reordered array.

8. The method as recited in claim 1, wherein generating the interval hash table includes:
merging a plurality of term reordered arrays into the interval hash table; and
generating a serialized interval hash table.

9. The method as recited in claim 8, wherein merging the plurality of term reordered arrays into the interval hash table includes:
computing a hash function over the global identifier of a term, wherein terms are partitioned across threads based upon their computed hash value.

10. The method as recited in claim 1, wherein generating the global hash table includes:
merging a plurality of interval hash tables by hashing term identifiers to populate a collision array such that the global hash table is accessible using the term identifiers to perform searches using the global hash table.

11. The method as recited in claim 1, wherein the threads are processed in a multi-level pipeline having intra-document pipelining and inter-document pipelining.

12. The method as recited in claim 1, further comprising mapping data-structures onto caches at different levels of a hierarchy of a memory system to provide cache conscious multi-threaded processing.

13. A non-transitory computer readable storage medium comprising a computer readable program for indexing documents, wherein the computer readable program when executed on a computer causes the computer to perform the steps of:
generating a single document hash table in storage memory for a single document using an index construction in a multithreaded and scalable configuration wherein multiple threads per processing core are each concurrently assigned work to reduce synchronization between threads wherein generating a single document hash table includes:

partitioning the single document into a plurality of subparts and indexing strings of partitioned subparts of the single document to create a minor hash table for each subpart;

generating a document level hash table from the minor hash tables;

generating an interval hash table in storage memory for a plurality of single document hash tables; and generating a global hash table in storage memory for a plurality of interval hash tables such that single documents or portions thereof can be searched by employing the global hash table wherein the interval hash table and the global hash table maintain the index construction for the threads;

updating a stream level hash table for the strings which maps every string to a global identifier, wherein the multiple threads per processing core are configured to read the strings from a buffer into the stream level hash table; and generating a term reordered array from the document level hash table.

14. The computer readable storage medium as recited in claim 13, wherein generating the single document hash table includes:

generating the single document hash table in a plurality of stages wherein each stage is performed by a separate core.

15. The computer readable storage medium as recited in claim 13, wherein the minor hash tables include a plurality of read/write count variables which are employed to synchronize simultaneous writing and reading operations from a same minor hash table.

16. The computer readable storage medium as recited in claim 13, wherein updating the stream level hash table for the strings which maps every string to a global identifier includes:

mapping between strings appearing in the single document and the global identifier to form a document level identifier to global identifier map.

17. The computer readable storage medium as recited in claim 13, wherein generating the term reordered array from the document level hash table includes:

partitioning an integer document which is generated by storing document level identifiers for each string;

computing a cumulative sum matrix for terms for each partition of the integer document and for all the threads; and generating the term reordered array for the single document where counts, global identifiers, frequency and position are formatted in the term reordered array.

18. The computer readable storage medium as recited in claim 13, wherein generating an interval hash table includes:

merging a plurality of term reordered arrays into the interval hash table; and generating a serialized interval hash table.

19. The computer readable storage medium as recited in claim 18, wherein merging the plurality of term reordered arrays into the interval hash table includes:

computing a hash function over the global identifier of a term, wherein terms are partitioned across threads based upon their computed hash value.

20. The computer readable storage medium as recited in claim 13, wherein the threads are processed in a multi-level pipeline having intra-document pipelining and inter-document pipelining.

21. The computer readable storage medium as recited in claim 13, further comprising mapping data-structures onto caches at different levels of a hierarchy of a memory system to provide cache conscious multi-threaded processing.

22. A system for indexing documents in a data storage system, comprising:

a plurality of multithreaded processing cores configured to process threads in accordance with an indexing construction program;

a hierarchical memory storage architecture configured to store hash tables and processing results; and the indexing construction program configured to assign an index construction to the threads, the index construction providing a multithreaded and scalable configuration configured to generate a single document hash table for a single document wherein multiple threads per processing core are each concurrently assigned work to be performed by the plurality of processing cores to reduce synchronization between the threads wherein the single document is partitioned into subparts and strings of partitioned subparts of the single document are indexed to create a minor hash table for each subpart, the single document hash table including:

a document level hash table generated from the minor hash tables;

a stream level hash table updated for the strings which maps every string to a global identifier, wherein the multiple threads per processing core are configured to read the strings from a buffer into the stream level hash table;

wherein the indexing construction program is configured to generate an interval hash table in storage memory for a plurality of single document hash tables; and generate a global hash table in storage memory for a plurality of interval hash tables such that single documents or portions thereof can be searched by employing the global hash table wherein the interval hash table and the global hash table maintain the index construction for the threads; and a term reordered array from the document level hash table.

* * * * *